United States Patent
Millington

(10) Patent No.: US 6,905,296 B2
(45) Date of Patent: Jun. 14, 2005

(54) PEEL-TYPE BLIND RIVET

(75) Inventor: Maurice Millington, Burntwood (GB)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/452,872

(22) Filed: Jun. 2, 2003

(65) Prior Publication Data
US 2004/0071525 A1 Apr. 15, 2004

(30) Foreign Application Priority Data
Jun. 6, 2002 (GB) .............................. 0213057

(51) Int. Cl.[7] .............................................. F16B 13/06
(52) U.S. Cl. .............................. 411/48; 411/43; 411/45; 411/46; 411/69
(58) Field of Search .............................. 411/43, 45, 46, 411/48, 69

(56) References Cited

U.S. PATENT DOCUMENTS

| 3,257,890 | A | * | 6/1966 | Kraemer | 411/43 |
|---|---|---|---|---|---|
| 4,620,825 | A | * | 11/1986 | Potzas | 411/34 |
| 4,877,362 | A | * | 10/1989 | Berecz et al. | 411/34 |
| 4,904,133 | A | * | 2/1990 | Wright | 411/43 |
| 4,969,785 | A | * | 11/1990 | Wright | 411/43 |
| 5,044,850 | A | * | 9/1991 | Getten et al. | 411/43 |
| 5,054,977 | A | * | 10/1991 | Schultz | 417/43 |
| 5,503,510 | A | * | 4/1996 | Golan | 411/43 |
| 5,645,383 | A | * | 7/1997 | Williams | 411/43 |
| 6,224,310 | B1 | * | 5/2001 | Summerlin et al. | 411/34 |
| 6,299,398 | B1 | * | 10/2001 | Shinjo | 411/43 |
| 2004/0071522 | A1 | * | 4/2004 | Millington | 411/43 |

FOREIGN PATENT DOCUMENTS

| GB | 2054082 | * | 2/1981 | F16B/10/10 |
|---|---|---|---|---|
| GB | 2233059 A | * | 1/1991 | F16B/19/10 |
| GB | 2332722 A | * | 6/1999 | F16B/19/10 |
| GB | 2 351 538 A | | 1/2001 | |
| GB | 2388063 A | * | 11/2003 | F16B/19/10 |
| JP | 2001-20924 | * | 1/2001 | F16B/10/10 |

* cited by examiner

Primary Examiner—Flemming Saether
Assistant Examiner—Katherine Mitchell
(74) Attorney, Agent, or Firm—Harness, Dickey & Pierce, P.L.C.

(57) ABSTRACT

A peel type blind rivet for securement in an aperture of one or more workpieces, the rivet having a tubular shell a flange abutting one side of the workpieces, together with a mandrel with a stem extending through the shell and forming an enlarged head adjacent to the tail end face of the shell, whereby the head has a plurality of axially extending cutting edges for engaging with the body shell the setting process of the rivet.

15 Claims, 5 Drawing Sheets

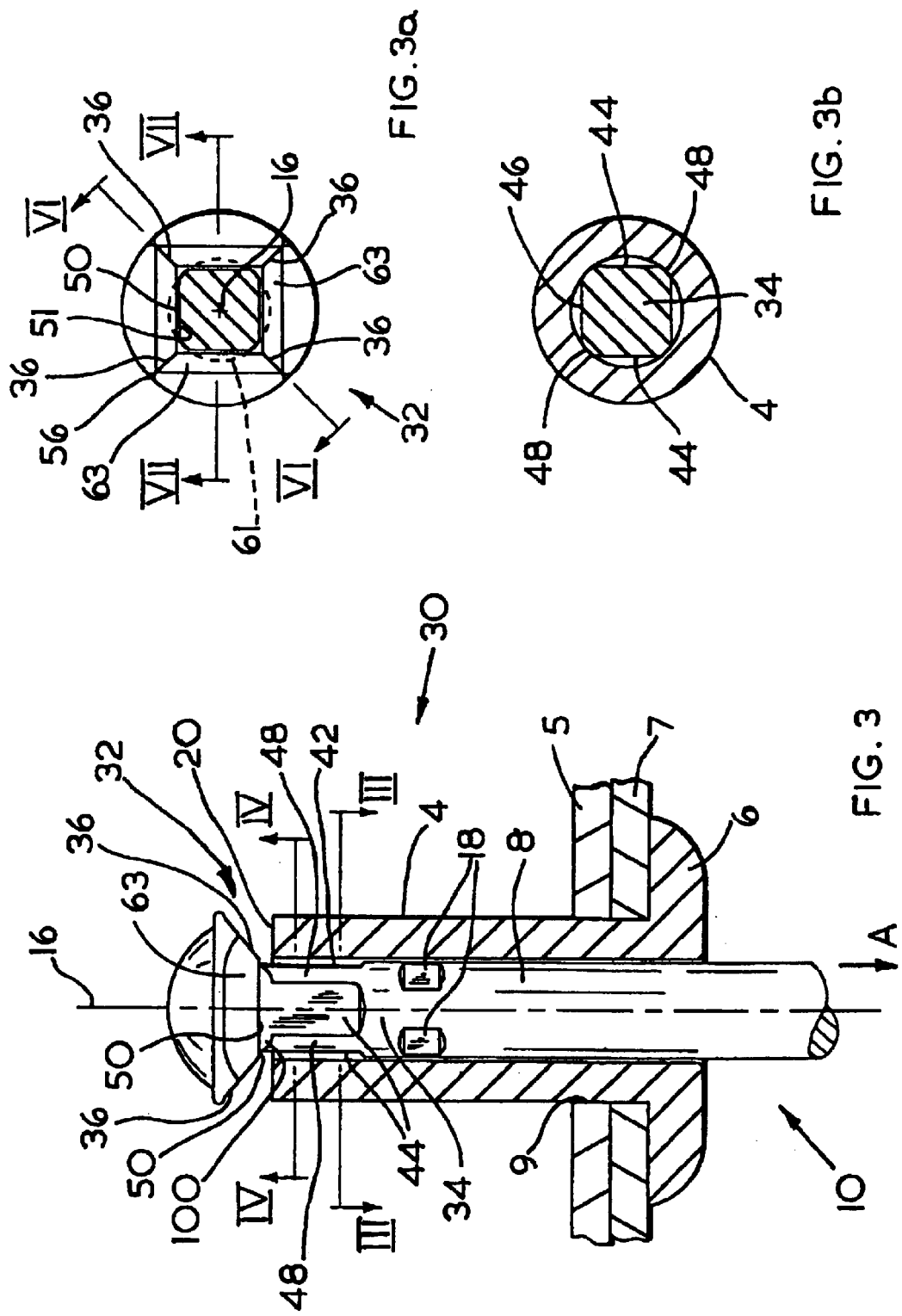

PEEL-TYPE BLIND RIVET

FIELD OF INVENTION

The present invention relates to peel-type blind rivet for engagement and securement in an aperture extending through one or more workpieces. Such rivets are usually used for securing together two apertured members or workpieces when the rivet is set wherein the inner surface of the workpieces are often inaccessible such that the blind rivets can only be set from one side.

BACKGROUND OF INVENTION

Conventional peel-type blind rivets comprise an outer tubular shell having an enlarged flange at one end, having a mandrel associated therewith with a stem extending through the tubular rivet so as to be coaxial therewith. The stem has a radially enlarged head at one end for engagement with an end face of the rivet, opposed to the enlarged flange. The periphery of the radially enlarged head of the mandrel is equal to or slightly smaller than the external circumference of the rivet shell, so that both parts can be inserted together through the aperture in the workpiece from a front side thereof until the flange of the rivet engages with the front surface of the workpiece. The enlarged head of the mandrel of peel-type blind rivets will comprise a plurality of cutting edges radially inclined between the outer circumference of the mandrel head and the stem so that in operation, as a tensile force is applied to the stem to draw the head into the rivet body, these edges are displaced against the rivet body thereby cutting or splitting the body into a plurality of segments whereby continued displacement of the enlarged head into the split rivet body causes "peel" like displacement of the segments until they engage with a rear side of the workpieces to hold the rivet body in the aperture and to compress the workpieces between these split segments and the flange of the rivet body. A continued application of the tensile force during the setting process then causes the mandrel stem to break, usually at a neck portion specifically designed to fail at a predetermined load, so as to remove the mandrel. This stem break results in a release of strain energy which causes the mandrel head part, which is temporarily lodged in the split end of the peeled back rivet shell, to be dislodged from its position and to move in the opposite direction to that in which it was previously pulled so that the mandrel head and the remaining part of the mandrel stem are both ejected from the rivet shell during the setting process.

Peel-type blind rivets of this type are well known and have been sold by the assignee of the present application under the registered Trade Mark POP® for several years.

However, there are instances whereby the ejection of the mandrel head from the peel-type blind rivet is undesirable, specifically where the rivet is being installed in the proximity of moving parts, or where electrical equipment is being installed and the dislodged mandrel head could effect contact with live electrical terminals. Of course, it is also desirable not to have a loose piece of metal "rattling" around in any sealed container utilising such peel-type blind rivets.

It is an object of the present invention to provide an improved type of peel-type blind rivet which alleviates the aforementioned problems and restrains the mandrel head in the rivet body after setting.

SUMMARY OF THE INVENTION

According to the present invention there is provided a peel-type blind rivet for securement in an aperture in one or more workpieces, the rivet comprising a tubular shell having a tail end face at one end and a preformed radially enlarged flange at the other end, the rivet further comprising a mandrel having a stem which extends through the shell and which has an enlarged head adjacent to the tail end face of the shell, the head having a plurality of axially extending edges beneath the enlarged head for engaging with the body during a setting process of the rivet when the stem is subject to a tensile load, so as to split the shell into a plurality of segments to engage with one side of the workpieces; characterised in that the head further comprises a deforming portion disposed radially between the stem and the edges, which deforming portion has at least a part surface thereof which is disposed radially outwards beyond the stem so as to engage and deform the shell both axially and radially as the head is displaced into the body, and the stem further comprising a rebate adjacent to the head for receiving at least part of the deformed shell of the rivet when set. Preferably, the deforming portion will be radially inclined relative to the stem and may preferably comprise a conical surface extending about a longitudinal axis of the stem.

Alternatively, the deforming portion may be formed as an inner portion of at least one of the edges. The edges themselves again are preferably radially inclined relative to the stem axis such that in a preferable embodiment, the deforming portion and the edges are inclined at different angles relative to the stem axis.

It is preferred that the head will comprise four edges equally spaced about the stem axis, usually at 90° to one another in order to provide an equally balanced deformation force when splitting the shell into a plurality of segments. Alternatively, any number of edges could be employed but it is preferred that the edges are equally spaced about the axis of the stem.

Preferably, the rebate in the stem will normally comprise a narrowed section about its entire circumference, whereby this narrowed section may be circular or rectangular in cross-section. Alternatively, the rebate may comprise a series of channels disposed about the periphery of the stem, whereby in one embodiment, the series of channels may themselves substantially form a square cross-section. It is preferable that where a series of channels is used to form the rebate, each of the channels will be associated and substantially adjacent to part of the deforming portion.

Preferably, the stem of rivets of this type will further comprise a weakened neck portion at which portion the stem will break under a predetermined tensile load, this neck portion defining a head shaft of the stem between the neck portion and the head. In this situation, the rebate will be formed in the head shaft.

Since rivets of this type are usually used in thin sheet material, it is preferable that the head shaft itself be between 3 and 5 mm long and preferably 4 mm.

A preferred embodiment of the present invention will now be described, by way of example only, with reference to the accompanying illustrative drawings in which:

BRIEF DESCRIPTION OF THE DRAWINGS

FIG. 3 is a side elevation of a peel-type blind rivet according to the present invention with the rivet body shown in section; and FIG. 3a is a section through the rivet mandrel of the rivet of FIG. 3 along the lines IV—IV; and FIG. 3b is a cross-sectional view through the rivet 30 of FIG. 3 along the lines III—III; and FIG. 3c is a cross-sectional view through the mandrel head 32 along the lines VI—VI of FIG. 3a.

DETAILED DESCRIPTION OF THE PREFERRED EMBODIMENTS

Figure 2:
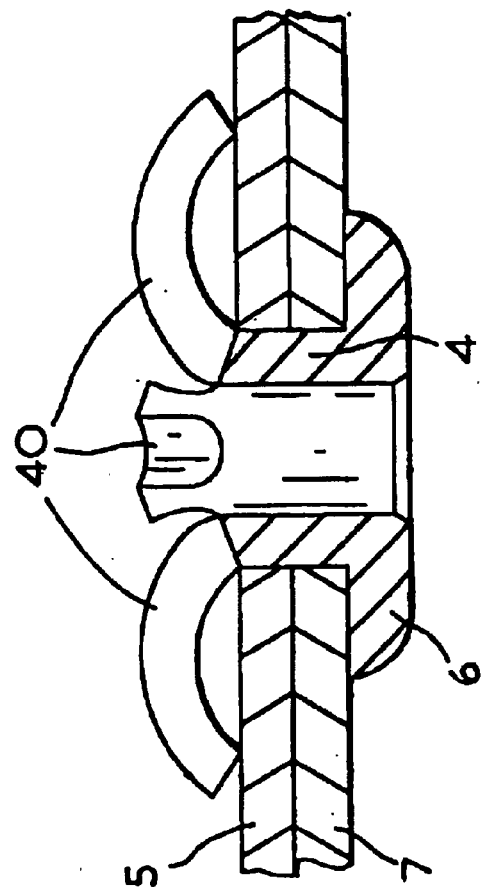
FIG. 2 is a longitudinal cross-section through the rivet of FIG. 1 after setting.
Figure 1:
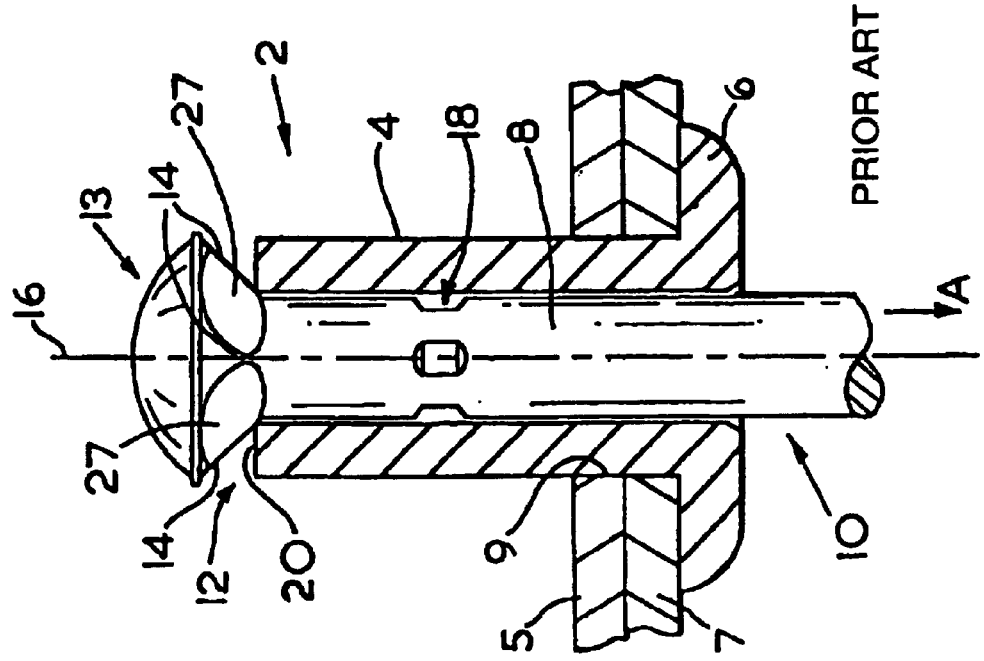
FIG. 1 is a side elevation of a peel-type blind rivet according to the prior art, prior to setting, with the rivet body shown in section.

Referring now to FIGS. 1 and 2, these show a peel-type blind rivet (2) according to the prior art, before and after setting respectively. From FIG. 1 it can be seen that the known rivet (2) comprises an outer cylindrical shell (4) having a flanged head (6). In operation, such a rivet may be used to join together two workpieces (5 and 7) having a hole (9) preformed (by drilling) therethrough. This preformed hole (9) is usually of complimentary size and fit to the external diameter of the rivet body (4). In this manner, the rivet (2) may be inserted through the hole (9) from an operator or (external side) (first through workpiece 7) so that the flange (6) is set against the workpiece (7) as shown. This rivet (2), further comprises a mandrel (10) having a substantially solid cylindrical stem (8) passing through the hollow interior of the body (4), and terminating at its remote end (12) with an enlarged head (13). The underside of this enlarged head (13) has four cutting edges (14) (of which three are visible in FIG. 1) which cutting edges (14) are inclined radially with respect to the stem axis (16). In addition, the stem (8) further comprises a weakened neck portion (18), which is shown here as a series of indents in the stem but may be a complete rebate extending about the entirety of the circumference. This neck portion (18) provides a weakened region whereby when sufficient tensile loads are applied to the stem (8) such stem will break at this neck portion.

FIG. 2 shows a rivet (2) of FIG. 1 after a setting operation has been undertaken. In particular, the rivet (2) is first inserted into the workpieces as shown in FIG. 1 whereby a setting tool (not shown) is then employed which maintains the flange (6) in engagement with the workpiece (7) whilst gripping the stem (8) and applying a tensile force in a direction A as show in FIG. 1. Application of this force serves to draw the mandrel in the direction A relative to the rivet body (4) resulting in the cutting edges (14) of the mandrel head (13) engaging with a free end (20) of the body (4) which, due to their tapered nature, such edges (14) serve to cut into the remote end (20) of the shell (4) creating lines of weakness. Continued displacement of the head (13) into the body (4) brings the larger diameter head (and specifically, radially inclined surfaces (27) extending between the cutting edges (such faces are usually flat, presenting a substantially rectangular/square cross-section)) into engagement with the newly split "arms" of such body, causing the body to split into four petals (three of which are shown in FIG. 2) which spread along the blind side (the inner side of the workpieces (7 and 5)) to the position shown substantially in FIG. 2, such that the workpieces (5 and 7) become compressed between the flange (6) and the petals (40). Once the petals (40) are displaced to a position shown in FIG. 2 further displacement of the head (13) downwardly or in the direction A shown in FIG. 2 is prevented by reaction of the workpieces through the body (4) which prevent further spreading of the petals (40). Continued tensile loading in the direction A is then transferred to the stem (8) until sufficient force is applied to effect breakage of the mandrel stem (8) at the neck portion (18). Subsequently, the ensuing release of energy by the stem break causes the mandrel head (13) to be ejected from the rivet body leaving the rivet body in the position shown in FIG. 2.

Figure 3D:
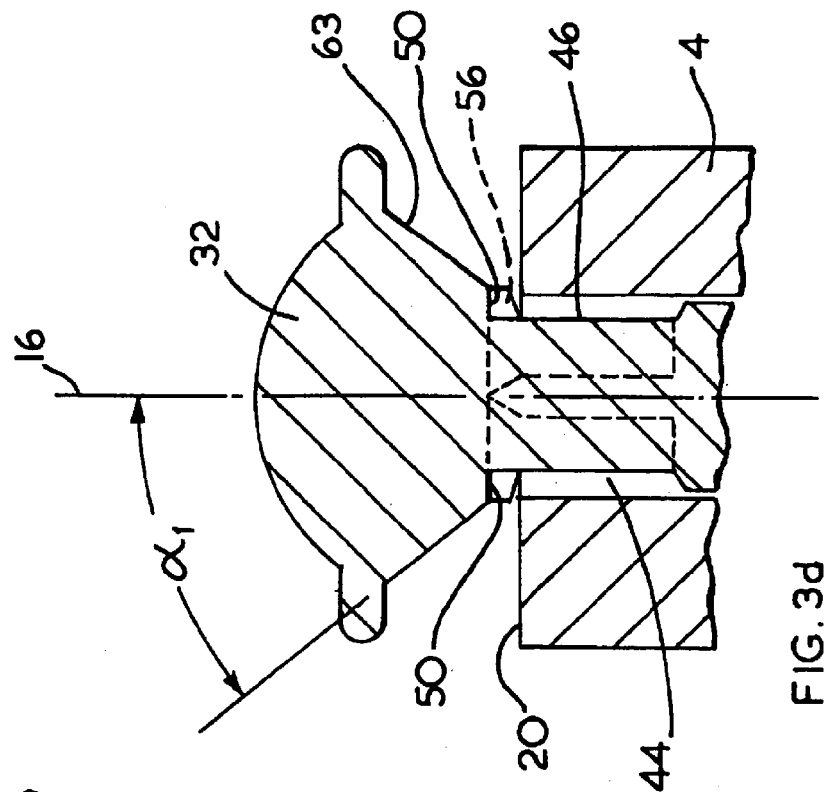
FIG. 3d is a cross-sectional view of the mandrel head of FIG. 3a along the lines VII—VII.
Figure 3C:
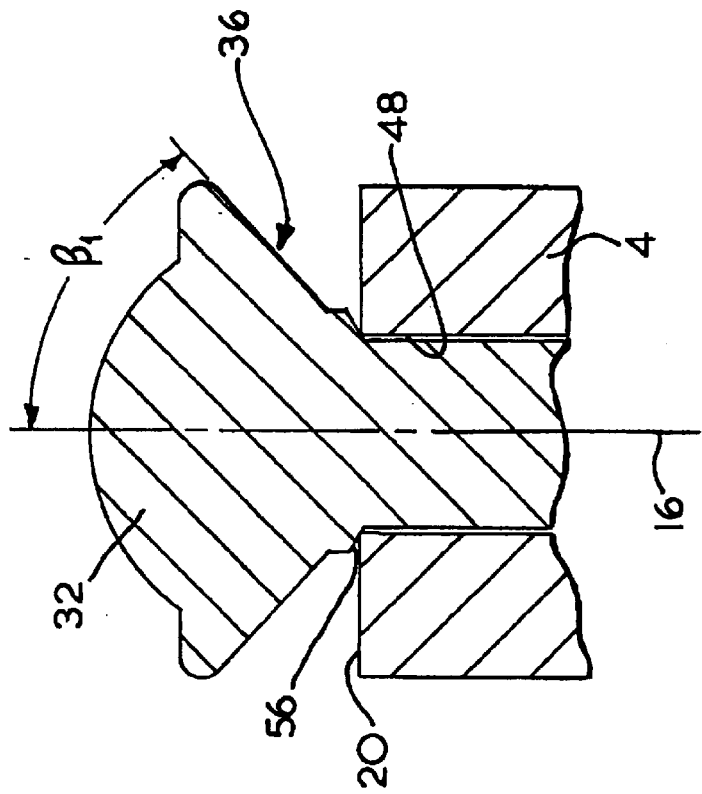
Figure 3E:
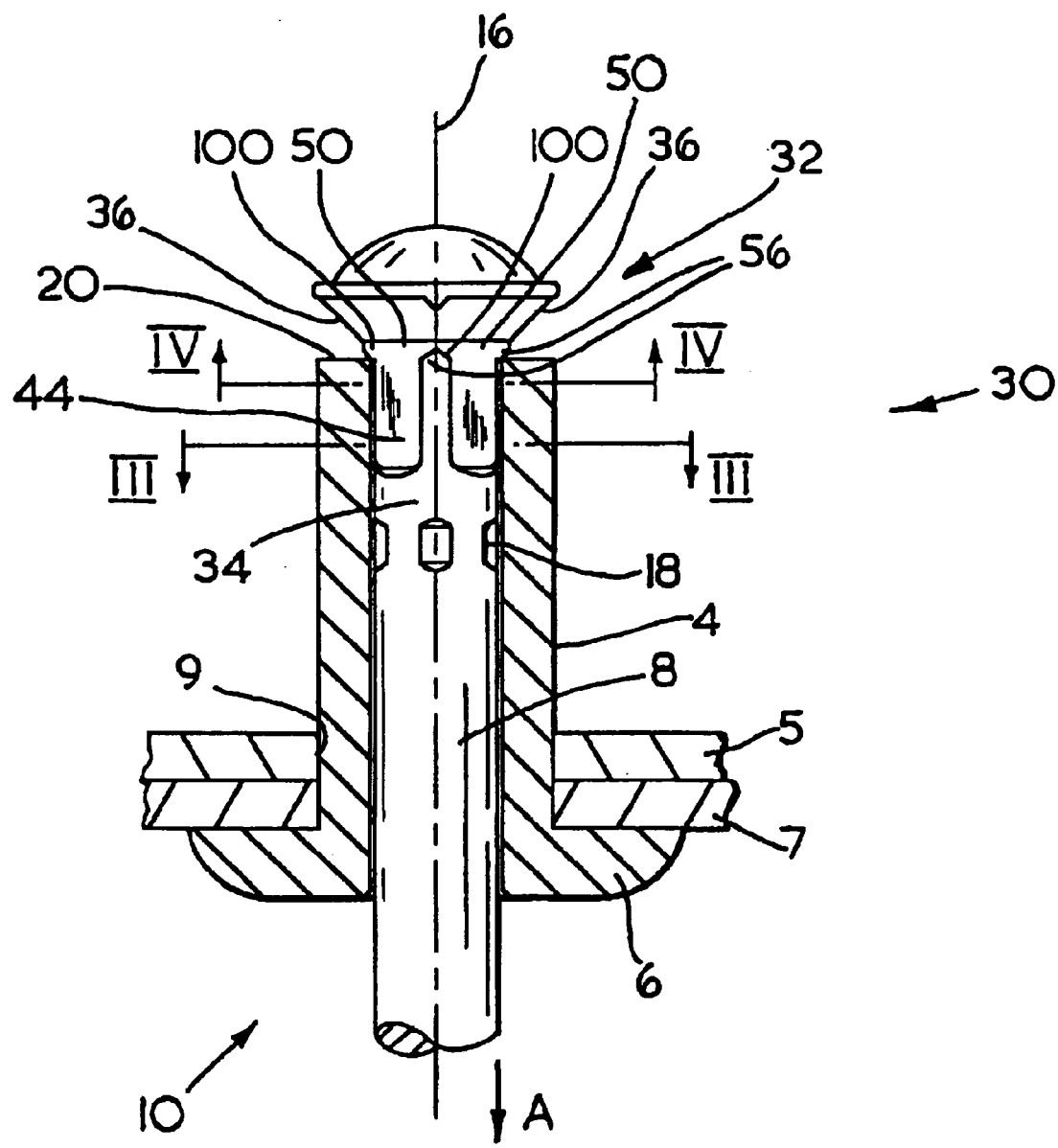
FIG. 3e is a similar side elevation of the peel-type blind rivet of FIG. 3 with the rivet body shown in section and rotated through 90° about its longitudinal axis.
Figure 4:
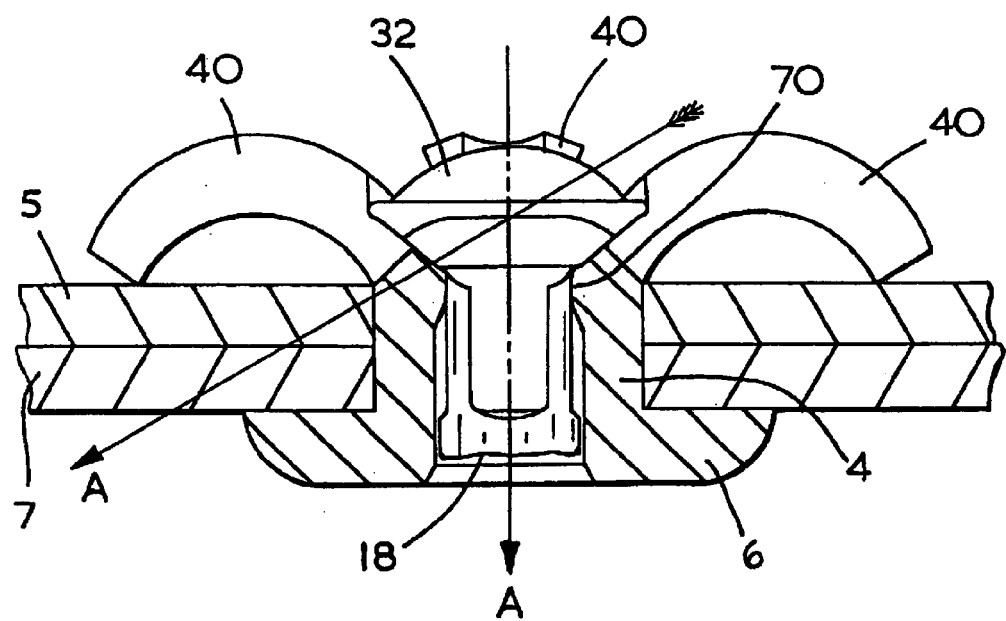
FIG. 4 is a cross-sectional view of the rivet of FIG. 3 after setting.

Referring now to FIG. 3 and FIG. 4, showing the improved blind rivet (30) according to the present invention prior to setting and following setting respectively, it will be appreciated that the rivet body (4) and mandrel stem (8) below the neck portion (18) are identical with the blind rivet of the prior art and will thus be numbered with corresponding numbers identifying like parts.

FIG. 3 shows an improved blind rivet (30) (prior to setting) again comprising a cylindrical body (or shell) (4) with a flange (6), which body (4) has been passed through a preformed hole (9) between workpieces (5 and 7) for the flange to engage with the outer surface of these workpieces. As in the prior art, the rivet (30) comprises a mandrel (10) having an elongate cylindrical stem (8) with a narrowed neck portion (18) forming a preformed break region intended to fail at a pre-set or predetermined tensile force.

However, the improved rivet (30) as shown in FIG. 3, in accordance with the present invention, has a modified mandrel head (32) and has a modified head shaft (34) (the headshaft being the region between the mandrel head (32) and the weakened neck portion (18)). In particular, the mandrel head (32) again comprises four cutting edges (36) (of which only two are shown in FIG. 3) inclined radially with respect to the stem axis (16). Referring to FIG. 3a, showing the formation of the head (32) in a direction along the shaft (8), it can be seen that the four cutting edges (36) are disposed about the central axis (16) of the cutting head spaced equidistantly apart at 90° to each other. Whilst four particular edges are used in this example it will be appreciated that any number could in practice be used, from three edges disposed at 120° relative to one another about the axis which would create three petals to any number, whereby the main requirement for preferential operation would be that such cutting edges are spaced at equal angles about the axis. Alternatively it is also feasible that the plurality of cutting edges could be displaced at variable angles effecting different sizes of petals between adjacent cutting edges, but this could result in uneven forces and stresses being created during the setting operation.

The exact configuration of the head will now be described in some detail with reference to FIGS. 3, 3a, 3b, 3c, 3d and 3e. Firstly, referring to FIG. 3b (section through the modified headshaft through a recessed portion (42)) this particular example shows the recess portion (42) being formed by a plurality of rebates (44) formed about the circumference of the headshaft (34) adjacent to the head (32). In particular, four such rebates (44) have been formed and positioned at 90° to one another about the stem axis so as to form two pairs of opposed parallel side faces (46). In this manner, the recessed portion (42) has been left with four rounded corners (48) (corresponding to the original diameter of the stem (8)) as best seen in FIG. 3b, with such rounded corners (48) retained in close frictional engagement with the inner surface of the cylindrical body (4) (as is the main stem body (8)).

Referring now to FIG. 3a the head (32) is disposed immediately above and adjacent to this recessed portion (42), and comprises a first substantially rectangular (preferably square) portion (50) which extends radially outwards of the stem axis (16) so as to intersect four inclined faces (63) of the mandrel head. This square portion (50) is press formed into the enlarged mandrel head so as to present four side faces extending perpendicular to the stem axis (16). However, it will be appreciated that these faces could also be angularly inclined relative to the stem axis if so desired. In this preferred embodiment, (as seen in FIGS. 3 and FIGS. 3a) the inner edge of the surface corresponds with the extended rebates (44). This surface is formed by the use of two sets of opposed dies, disposed at 90° to each other, which engage with a portion of the mandrel head adjacent to the stem (8) so as to press form this substantially square profile. It will also be appreciated that the displaced material in the head, during this pressing operation, is then effectively squeezed towards the four corners defined by the intersections of adjacent dies to form four radial projections (56) which extend axially from the surface along the outer surface of the mandrel stem (8) (as indicated by reference numeral (100) in FIG. 3 and FIG. 3e). Dependent on the design of the intersections of the four dies, the material deformed into projection (100) could present a substantially flat perpendicular face in an axial direction or could be inclined relative to the stem axis (16) as shown in FIGS. 3 and 3c.

Referring now to FIGS. 3a, 3c and 3d, each of the four inclined faces (63) of the mandrel head intersect each other along the four cutting edges (36). Each of the cutting edges (36) are preferably inclined at an angle β1 relative to the stem axis (16) at an angle of 50°, although such angles can be varied anywhere between 40° and 60° and preferably between 45° and 55°. Subsequently, the angle α of the inclined faces or walls (63) extending between these cutting edges (36) are inclined at an angle α relative to the stem axis (16) preferably at an angle of 40° when β1 is set at 50°. It will be appreciated that the angle α1 can vary between 30° and 50° dependent on the corresponding angle β1. Preferably the angle in the range of α will lie between 35° and 45°.

Engagement of the four sidewalls of the portion (50) at each corner creates a deforming portion (56) (in this case the intersection of the faces of the portion (50) which are best seen in FIGS. 3a and 3e). It will be appreciated from the view in FIG. 3a, that these deforming portion (56) comprise the projection members (100) previously described and thus, when viewed end-on as in FIG. 3a, presents a lower deforming surface (56) which is axially displaced relative to the flat surface. However, it will also be appreciated that if so required the material that has flowed to form projection (100) during the pressing operation could be removed from the mandrel if required to present a substantially flat surface of the deforming portion (56) co-planer with the surface.

For illustrative purposes in FIG. 3a, the relationship between the stem diameter and the head (32) is shown by use of a dotted line (61) (whereby due to the close frictional relationship between the stem (8) and the body (4) of the rivet this dotted line (61) also represents the inner diameter of the body (4)). In this manner, it will be appreciated that the deforming portion (56) project radially outwards beyond the stem diameter and thus overlies at least part of the body (4) at these "corner" regions. Due to the recessed nature of the recess portion (42) the sidewalls of the portion (50) (in between the adjacent corners or deforming portion (56)) do not, in this embodiment, overlie any of the body portion (4) of the rivet, and so only the deforming portion (56) are capable of engagement with the body (4). However, if required, the overlap area of the deforming portion (56) can be varied by varying the size (depth) of the rectangular portion (50) and, hence, the deforming portion (56).

Extending in an axial direction away from the stem (8), (and recess (42)) is a conventional head formation for this type of peel-type blind rivet having four cutting edges (36) formed by the intersection of four inclined walls (63) (FIG. 3 and 3a), whereby each of the inclined faces (63) are axially aligned with the four corresponding walls of the portion (50). In this manner, the cutting edges (36) formed by such intersections are aligned angularly with each of the four deforming portion (56) (FIG. 3a) about the stem axis.

Again referring to FIGS. 3c and 3d, it will be appreciated that the rivet assembly (30), prior to setting, will result in the mandrel being received in the body (4) until such time as the deforming portion (56) abut with the end face (20) of the body (4). As seen in FIG. 3d, the surface is thus held remote from the end surface (20) since it is axially offset with respect to the body engaging faces of the deforming portion (56). However, it will be appreciated that if the deforming portion (56) were maintained co-planer with the substantially flat surface then the entire surface would engage in this pre-set position with the end face (20). Also as shown in FIG. 3c, the shoulders of these deforming portion (56) (extending outwardly of the stem (8)) are not perpendicular to the axis (16) but are inclined and slightly curved so that any force transmitted from the mandrel head to the rivet body (4) through these surfaces will comprise an angular component as will be described with reference to Force F in FIG. 4 later. However, this is again an optional feature, wherein the shoulder of such deforming portion (56) could be set at right angles to the stem axis (16). It is also important to note from FIG. 3d that the recess portion (44) of the stem (8) is immediately adjacent to both the deforming portion (56) and the surface such that any material deformed from the body (4) will immediately flow into these recesses (44) as will be described subsequently with reference to FIG. 4.

As best seen in FIGS. 3c and 3d, the inclined faces (63) are inclined at an angle α1 (relative to the stem axis) and, thus, the intersection of two adjacent walls (63) provide for a cutting edge disposed therebetween to be at an angle β1 relative to the stem axis (16).

As is conventional, it is important that the cutting edges (36) are disposed at an appropriate inclined angle relative to the stem axis (16) to achieve the job of creating a weakness and eventually leading to splitting of the body (4) during setting of the rivet. However, it is not essential for the deforming portion (56) to "cut through" the body (4) wall, during setting, but its primary purpose is to engage and effect deformation thereof as will be discussed below.

In addition, whilst this preferred embodiment (as shown in FIG. 3b) creates a recess portion (42) by the formation of four rebates (44) the exact nature of the recess portion (42) is not of critical importance (although the preferred embodiment having flattened recesses creating substantially a square cross-section provides for ease of manufacture) and in fact this recess portion (42) could alternatively comprise a cylindrical recess extending around the entire circumference of the stem, whereby the inner surface of any such recess could again be cylindrical, square, rectangular or any other shape. Alternatively, any other array of rebates could be formed in the outer circumference to achieve the same function. The minimum requirement and objective of the recess portion (42) is to provide an area within the stem into which a deformed portion of the rivet body can be displaced during the setting operation (as discussed below).

During setting of this improved blind rivet (30), a setting tool is again employed in a manner described with reference to the prior art (rivet of FIGS. 1 and FIGS. 2) to hold the flange (6) in abutment with the workpieces 7 whilst a tensile force is applied in direction A to the stem (8). In this manner, the deforming portions (56) are brought into engagement with part of the end face (20) of the rivet body (4) (FIG. 3c) which they overlie, whereby the inclined deforming portion (56) will either (as in the current embodiment) partially deform the rivet body radially outwards and partially serve to begin splitting the end face (20) or, in the case of a flat surface of such a deforming portion, will serve to effect minor deformation of the end face of the rivet body (4) (any angular component of the deforming portion will effect radial deformation) until the main cutting edges (36) are drawn into abutment with the cylindrical body (4) to thereby effect splitting of the body (4) in a conventional manner as discussed with reference to FIGS. 1 and 2. At this stage, the side faces (63) of the head then exert a force on the split petals of the body (4) forcing them apart in a conventional manner, whereby the splitting and curled formation of the petals (or legs) also serve to displace the body (4) away from and out of engagement with the deforming portion (56).

In this manner, the petals (40) as shown in FIG. 4 are formed in a conventional manner until such time that continued displacement of the head (32) towards the flange (6) of the rivet causes the edges of the hole (9) formed in the workpieces (5 and 7) to restrict further radial displacement of the petals (40) from their final set position as shown in FIG. 4. At this position, the rivet body (4) is restrained from further radial deformation by the edge of hole (9) and workpieces (5, 7), whereby continued displacement of the rivet head (32) towards the flange (6) of the rivet body by continued application of force A effects re-engagement of the deforming portion (56) with the body (4) since the diameter of the body (4) in this region is limited by the sides of the hole (9) which allows for only very limited radial expansion until the hole becomes filled. In this preferred embodiment, this re-engagement between the deforming portion (56) and the inner surface of the body (4) effects the transfer of a deforming load F (FIG. 4) in a direction inclined relative to the force A thereby providing both axial and radial deformation of at least part of the rivet body (4) effectively squeezing the body between the mandrel head (32) and the walls of the hole (9) to deform material of the rivet body (4) into the associated adjacent recesses (44) formed in the head shaft (34), as shown at (70) in FIG. 4. The displaced flow of material of the body (4) serves to both expand the body into the hole (9) and also flow about the circumference of the mandrel stem until it is able to flow into the recesses (44).

Continued application of a tensile force A thereby increases the force on the stem (8) due to the head being restrained from further axial displacement, whereby this increase in tensile force effects failure at the neck portion (18) of the stem in a conventional manner. However, in this situation engagement of the deformed material (70) of the rivet body into the recess (44) restrains the head (32) from being ejected from the set rivet, as shown in FIG. 4.

It will be appreciated here that the basic concept involves the provision of a recess portion within the headshaft of the mandrel with associated deforming portion displaced between this recess and the cutting edges of a conventional peel-type blind rivet to effect mechanical deformation of the rivet body, once the deformation of the petals (40) has been completed, to cause at least a portion of the body (4) to deform and flow into the recess to effect mechanical engagement between the set rivet body (4) and the rivet head (32).

Normally these type of blind rivets are used with thin layer material (5 and 7), usually in the order of 3 mm thickness, as such, it is preferable that the headshaft portion of the blind rivet to be in the region of 3–5 mm long and usually 4 mm.

In addition, it will be appreciated that there are many variations to the above preferred embodiment which still fall within the scope of the general inventive concept. In particular, whilst the headshaft portion can be either the same diameter as the general diameter of the mandrel it may also be formed as a square section. The advantage of a square section is that the tooling to manufacture the head of the mandrel is of lower cost and also the corners of the square section help keep and guide the mandrel head it a central position in the rivet body during the setting operation. Furthermore, whilst it is preferable to provide a mandrel head (32) with the deforming portion (56) effectively forming a second cutting edge aligned with the first cutting edge (36) but each of the cutting edge and deforming portion set at different angles relative to the stem axis, the deforming portion (56) could alternatively present a flat end face overlying the body to achieve a similar function. It will be appreciated, in this design, that close to a final setting position, the various angled faces of the mandrel head tend to "wedge" the wall of the rivet body into the hole (9) in the workpiece, whereby continued resultant force in a downward direction results in deformation of the rivet material in a generally downwards direction whereby it can only flow into the recess formed in the mandrel stem, effecting thus both radial and axial deformation of the shell. The "squeezed" body material must flow into the only available space below the head (32).

Whilst this preferred embodiment presents a four facetted head, allowing maximum material movement to occur at the corner intersections of the facet faces, in practice, the deforming portion (56) need not be aligned with the cutting edges (36) but could be offset or disposed between the cutting edges. The primary objective being that these deforming portion, at the position shown in FIG. 4, re-engage with the body (4) to effect deformation of body (4) material into the recess in the headshaft. It is also possible that only one deforming portion (56) will be necessary to achieve the objective of this invention, which could be either associated with one of the cutting edges (36) or disposed remote from all of the cutting edges. Whilst it is preferable to symmetrically align the various cutting edges and deforming portion so that the setting force is equally applied about the circumference of the rivet body (4), it is also envisaged that simply one deforming portion is necessary to achieve the objectives of the invention and to effect appropriate deformation of part of the rivet body into an associated recess. In such a situation, the mandrel head is restrained from any lateral displacement in the hole (9) whilst any material (70) of the body which has been "squeezed" into a recess of the headshaft will prevent axial displacement.

Still further, whilst this preferred embodiment utilises substantially rectangular or a square portion (50) whereby only the corner intersections form deforming portion (56), it is equally feasible and envisaged that this portion (50) could be circular so as to effect uniform deformation of the body (4), in the setting position, about the entire inner circumference of this body. In such a situation, the entire circumference of the portion (50) would overlie, partially, the body (4) where portion (50) may in fact be conical, provided that sufficient recesses are formed within a headshaft to accommodate the amount of displaced material of the body (4) when setting has been achieved. Again, such a conical form of deformation means would initially cause radial deformation of the end face (20) of the body at the start of the setting operation, but the spreading of the petals (40) in the conventional manner would again displace the body (4) out of engagement with such portion (50) until the final selling position at FIG. 4 is again achieved to re-engage such deforming portion with the body (4) as previously described.

While the above description constitutes the preferred embodiment(s), those skilled in the art will appreciate that the present invention is susceptible to other modifications and changes without departing from the proper scope and fair meaning of the following claims.

I claim:

1. A peel type blind rivet for securement in an aperture in one or more work pieces, the rivet comprising:
   a tubular shell having a tail end face at one end and a pre-formed radially enlarged flange at the other end;
   a mandrel having a stem which extends through said shell and an enlarged head adjacent the tail end face of said shell;
   said head having a plurality of first faces inclined at a first angle; and
   a plurality of axially extending edges beneath said enlarged head for engaging with said body during a setting process of said rivet when the stem is subject to a tensile load, so as to split the shell into a plurality of segments to engage with one side of the work pieces;
   a means for deforming the tubular shell disposed between said stem and said edges, said means for deforming having at least a partial surface thereof disposed radially outwards beyond said stem so as to engage and deform said shell both axially and radially as said head is displaced into said body, and said stem comprises a rebate adjacent said head for receiving at least part of said deformed shell of said rivet when set, said rebate comprises a second inclined surface disposed between the means for deforming the tubular shell inclined at a second angle greater than the first angle.

2. A rivet as claimed in claim 1, wherein said deforming means presents a substantially flat surface perpendicular to an axis of said mandrel.

3. A rivet as claimed in claim 1, wherein said deforming means is radially inclined relative to a longitudinal axis of said stem.

4. A rivet as claimed in claim 3, wherein said deforming means comprises a conical surface.

5. A rivet as claimed in claim 1, wherein said deforming means is formed at least partially as an inner portion of at least one of said edges.

6. A rivet as claimed in claim 3, wherein said edges are radially inclined relative to a longitudinal axis of said stem.

7. A rivet as claimed in claim 6, wherein said deforming means and said edges are inclined at different angles to said stem axis.

8. A rivet as claimed in claim 6, wherein said means for deforming comprises four edges equally spaced about said axis of said stem.

9. A rivet as claimed in claim 1, wherein said rebate comprises a narrowed section of said stem.

10. A rivet as claimed in claim 9, wherein said narrowed section of said stem is circular in cross section.

11. A rivet as claimed in claim 9, wherein said narrowed section of said stem is rectangular in cross section.

12. A rivet as claimed in claim 1, wherein said rebate comprises a series of channels disposed about the periphery of said stem.

13. A rivet as claimed in claim 1, wherein the stem further comprises a weakened neck portion at which portion said stem will break under tensile load, defining a headshaft of said stem between said neck portion and said head.

14. A rivet as claimed in claim 13, wherein said rebate is formed in said headshaft.

15. A rivet as claimed in claim 13, wherein said headshaft is between 3 and 5 mm long.

* * * * *